(12) United States Patent
Reichow et al.

(10) Patent No.: US 11,422,022 B2
(45) Date of Patent: Aug. 23, 2022

(54) LOAD CELL ASSEMBLY FOR A TOWING VEHICLE

(71) Applicant: Vishay Transducers, Ltd., Kent, WA (US)

(72) Inventors: Keith Reichow, Kent, WA (US); Bill Zimmerman, Seattle, WA (US)

(73) Assignee: Vishay Transducers, Ltd., Kent, WA (US)

( * ) Notice: Subject to any disclaimer, the term of this patent is extended or adjusted under 35 U.S.C. 154(b) by 0 days.

(21) Appl. No.: 16/458,871

(22) Filed: Jul. 1, 2019

(65) Prior Publication Data

US 2020/0018635 A1 Jan. 16, 2020

Related U.S. Application Data

(63) Continuation of application No. 15/431,677, filed on Feb. 13, 2017, now Pat. No. 10,337,908.

(60) Provisional application No. 62/297,733, filed on Feb. 19, 2016.

(51) Int. Cl.
*G01G 19/12* (2006.01)
*G01G 3/14* (2006.01)
*G01G 19/02* (2006.01)
*B60D 1/01* (2006.01)

(52) U.S. Cl.
CPC ............ *G01G 19/12* (2013.01); *G01G 3/1412* (2013.01); *G01G 19/021* (2013.01); *B60D 1/015* (2013.01)

(58) Field of Classification Search
USPC ......................................................... 177/136
See application file for complete search history.

(56) References Cited

U.S. PATENT DOCUMENTS 3,602,866 A * 8/1971 Saxl ........................ G01L 5/10
338/5
3,661,220 A * 5/1972 Harris .................... G01G 19/12
177/136
(Continued)

FOREIGN PATENT DOCUMENTS

AU 2015258316 A1 * 6/2017
DE 4402525 A1 8/1994
(Continued)

OTHER PUBLICATIONS

Citation Copy AU-2015258316-A1 (Year: 2015).*
(Continued)

*Primary Examiner* — Alexander A Mercado
*Assistant Examiner* — Monica S Young
(74) *Attorney, Agent, or Firm* — Perkins Coie LLP

(57) ABSTRACT

A cast load cell comprising a load sensing portion integrally cast with a first mounting portion. The load sensing portion has a flexure portion spaced apart from the first mounting portion by a flexure gap. The load sensing portion has at least one sensor cavity above at least a portion of the flexure gap. A second mounting portion is integrally cast with the load sensing portion above the flexure gap. A load sensor is connected to the load sensor portion and positioned within the sensor cavity above a portion of the flexure gap. The first mounting portion, the load sensing portion, and the second mounting portion define an integral, low-profile, weld-free, substantially homogenous unitary cast member.

18 Claims, 10 Drawing Sheets

(56) References Cited

U.S. PATENT DOCUMENTS

| | | | | |
|---|---|---|---|---|
| 3,854,540 A * | 12/1974 | Holmstrom, Jr. | ........ | G01G 5/04 177/136 |
| 4,020,911 A * | 5/1977 | English | ................ | G01G 3/1406 177/136 |
| 4,095,659 A * | 6/1978 | Blench | ................... | G01G 19/12 177/136 |
| 4,364,279 A * | 12/1982 | Stern | ................... | G01L 1/2225 338/5 |
| 4,666,003 A * | 5/1987 | Reichow | ................ | G01G 19/12 177/136 |
| 4,762,334 A * | 8/1988 | Altherr | ............. | B62D 53/0807 280/433 |
| 4,813,504 A * | 3/1989 | Kroll | ................... | G01G 3/1402 177/21 |
| 5,029,947 A * | 7/1991 | Knight | .................. | G01G 19/12 303/7 |
| 5,353,645 A | 10/1994 | Feldman et al. | | |
| 5,368,324 A * | 11/1994 | Kaim | ..................... | B62D 53/08 280/438.1 |
| 5,391,844 A * | 2/1995 | Johnson | ............... | G01G 3/1412 177/210 FP |
| 5,435,194 A * | 7/1995 | Schedrat | ............ | B62D 53/0871 280/504 |
| 5,526,702 A * | 6/1996 | Schedrat | ............ | B62D 53/0871 177/136 |
| 5,765,849 A * | 6/1998 | Moulton | ............ | B62D 53/0807 280/433 |
| 6,037,550 A | 3/2000 | Bradley | | |
| 6,302,424 B1 * | 10/2001 | Gisinger | ............ | B62D 53/0871 280/433 |
| 6,495,774 B1 * | 12/2002 | Pederson | ............... | G01G 19/08 177/136 |
| 7,530,589 B1 * | 5/2009 | Mann | ................. | B62D 53/0814 280/433 |
| 8,342,557 B2 * | 1/2013 | Sibley, Jr. | .......... | B62D 53/0814 280/438.1 |
| 8,342,558 B1 * | 1/2013 | Su | ...................... | B62D 53/0828 280/438.1 |
| 8,720,931 B2 | 5/2014 | Zaagman | | |
| 10,337,908 B2 | 7/2019 | Reichow et al. | | |
| 2002/0069708 A1 * | 6/2002 | McKenna | ............ | G01G 3/1408 73/862.637 |
| 2003/0047906 A1 * | 3/2003 | Hicks | ................. | B62D 53/0807 280/433 |
| 2004/0226755 A1 * | 11/2004 | Pottebaum | ......... | G01G 23/3735 177/25.13 |
| 2006/0231296 A1 * | 10/2006 | Knudsen | .................. | G01G 3/12 177/132 |
| 2006/0290101 A1 * | 12/2006 | Rosenberg | ............... | B60D 1/52 280/507 |
| 2011/0253462 A1 * | 10/2011 | Reichow | ................ | G01G 19/12 177/136 |
| 2013/0106076 A1 * | 5/2013 | Zaagman | ............... | B62D 53/08 280/438.1 |
| 2014/0262551 A1 * | 9/2014 | Santi | .................... | G01G 19/083 177/1 |
| 2017/0144714 A1 * | 5/2017 | Dupay | .................... | F16H 1/222 |
| 2019/0113402 A1 * | 4/2019 | Schutt | ....................... | G01L 1/24 |
| 2020/0155135 A1 * | 5/2020 | Cole | .................... | A61B 5/4528 |

FOREIGN PATENT DOCUMENTS

| | | | | |
|---|---|---|---|---|
| EP | 0548487 A2 | 6/1993 | | |
| GB | 2275784 A * | 9/1994 | ......... | B62D 53/0871 |
| GB | 2275784 A | 9/1994 | | |
| WO | WO-0134454 A1 * | 5/2001 | ............ | B62D 53/08 |

OTHER PUBLICATIONS

International Searching Authority, International Search Report and Written Opinion, PCT Patent Application PCT/US2017/017731, dated May 9, 2017, 13 pages.

* cited by examiner

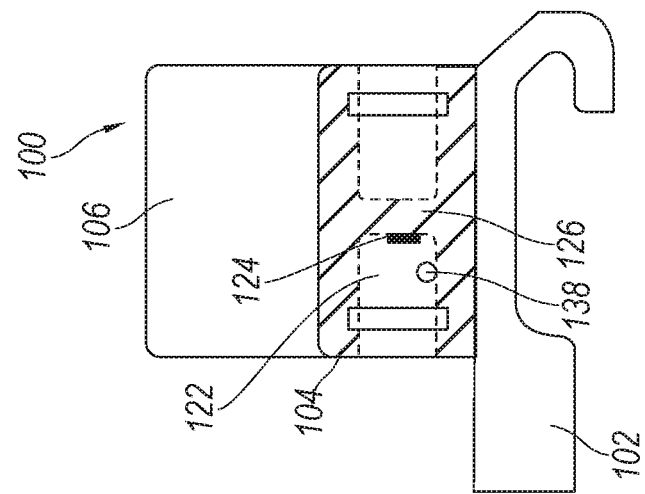
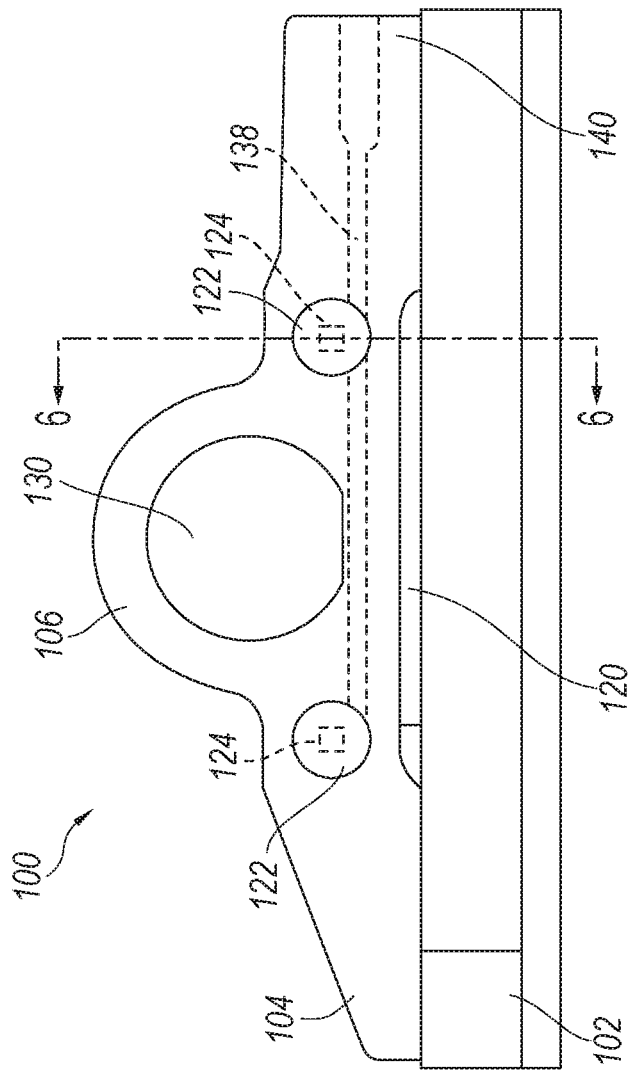

LOAD CELL ASSEMBLY FOR A TOWING VEHICLE

CROSS-REFERENCE TO RELATED APPLICATION

This patent application is a continuation of U.S. patent application Ser. No. 15/431,677, titled Load Cell Assembly for a Towing Vehicle, filed Feb. 13, 2017, which claims priority to and the benefit of U.S. Provisional Patent Application No. 62/297,733, titled Load Cell Assembly, filed Feb. 19, 2016, both of which are incorporated herein in their entireties by reference.

TECHNICAL FIELD

This application relates generally to load cells, and in particular to load cells for use with vehicles, including truck and trailer combinations.

BACKGROUND

Load cell assemblies are often used with vehicles, including truck-trailer combinations to measure and monitor the loads carried by the truck and/or trailers. Conventional load cell assemblies include precision-machined load cell bodies made from carefully controlled steel bar or plate stock. These precision load cells can be used with fifth wheel trailer systems. The fifth wheel load cell bodies are typically welded or bolted to support brackets. This assembly is then attached to a frame that mounts to a portion of the towing vehicle. These precision controlled load cells can be labor intensive and relatively expensive to manufacture. In addition, many conventional fifth wheel trailer configurations cannot use the conventional load cell systems because integration of the load cells into the fifth wheel connection system adds too much height to the connection structure, which results in an unacceptable total height of the fifth wheel trailer. For example, a SAF-Holland, Inc.'s sliding fifth wheel mounting system, such as is described in U.S. Pat. No. 8,720,931 (which is incorporated herein in its entirety by reference thereto) includes track-mounted support brackets pivotally connected to a hitch plate. This sliding arrangement is not suitable for use with conventional load cells without adding undesired height to the overall mounting system. As a result, such fifth wheel trailer configurations are operated without using load cells that would accurately measure and monitor the loads carried by the truck and trailer.

BRIEF DESCRIPTION OF THE DRAWINGS

For a better understanding of the various described embodiments, reference should be made to the Detailed Description below, in conjunction with the following drawings. Like reference numerals refer to corresponding parts throughout the figures and descriptions.

FIG. 5 is a side elevation view of the cast load cell assembly of FIG. 3.

FIG. 6 is a cross sectional view of the cast load cell assembly taken substantially along line 6-6 of FIG. 5.

DETAILED DESCRIPTION

Overview

Figure 1:
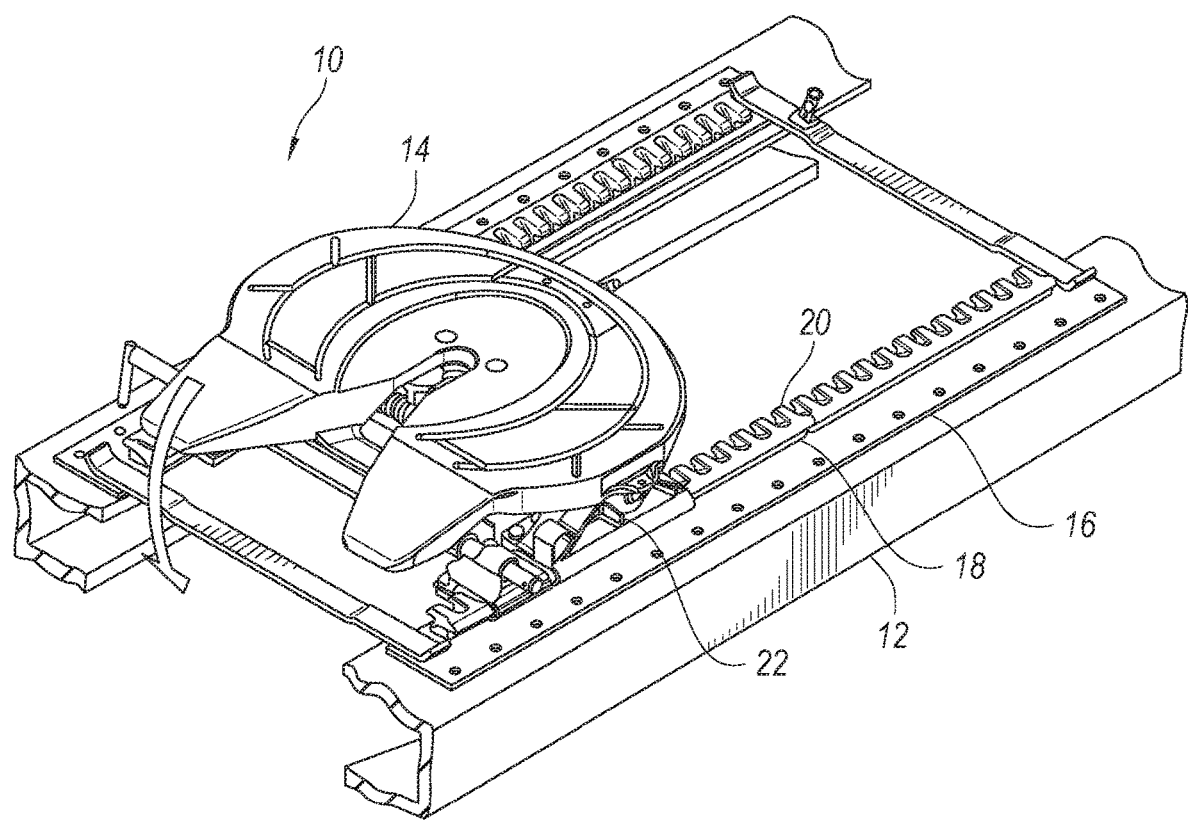
FIG. 1 is an isometric of an adjustable fifth wheel mounting system of the prior art.

A cast load cell assembly is disclosed for use with an adjustable or fixed fifth wheel trailer coupling system that has a first mounting portion connectable to a towing vehicle and a second mounting portion coupleable to a fifth wheel trailer. The cast load cell assembly comprises a mounting plate portion with mounting features configured for being connected to the towing vehicle. A load sensing portion is integrally formed with and connected to the mounting plate portion. The load sensing portion has a flexure portion spaced apart from the mounting plate portion to define a flexure gap therebetween that allows the sensing portion to move relative to the mounting plate in response to a load on the load sensing portion. The load sensing portion has a sensor cavity machined therein above at least a portion of the flexure gap. A shaft mounting portion is integrally formed with and connected to the load sensing portion above the flexure gap. The shaft mounting portion is configured to pivotally receive the second mounting portion of the fifth wheel coupling system. A load sensor is connected to the load sensor portion and positioned within the sensor cavity above a portion of the flexure gap. The mounting plate portion, the load sensing portion, and the shaft mounting portion define an integral, low-profile, weld-free, substantially homogenous, unitary cast member, into which the sensing cavity is machined and the load sensor is attached.

Another embodiment provides a cast load cell assembly comprising a first mounting portion configured to connect to a first portion of a vehicle mounting system. A load sensing portion is integrally connected to the first mounting portion. The load sensing portion has a flexure portion spaced apart from the first mounting portion by a flexure gap. The load sensing portion has at least one sensor cavity above at least a portion of the flexure gap. A second mounting portion configured to mount to a second portion of the vehicle mounting system is connected to the load sensing portion above the flexure gap. A load sensor is connected to the load sensor portion and positioned within the sensor cavity above a portion of the flexure gap. The first mounting portion, the load sensing portion, and the second mounting portion define an integral, low-profile, weld-free, substantially homogenous, unitary cast member.

Another embodiment provides a fifth wheel load cell system for use with a truck and fifth wheel trailer, comprising a mounting frame connectable to the truck, and a fifth wheel mounting plate has a pair of mounting shafts and is engagable with the fifth wheel trailer. A pair of cast load cell assemblies with integral load cells are connected to the mounting frame and the fifth wheel mounting plate. Each cast load cell assembly comprises a first mounting portion having mounting features coupled to the mounting frame. A load sensing portion is integrally formed with and connected to the first mounting portion. The load sensing portion has a flexure portion spaced apart from the first mounting portion and defines a flexure gap therebetween that allows the sensing portion to move relative to the first mounting in response to a load on the load sensing portion. The load sensing portion has a sensor cavity machined therein above at least a portion of the flexure gap. A second mounting portion is integrally formed with and connected to the load sensing portion above the flexure gap. The second mounting portion is configured to pivotally receive a respective one of the pair of mounting shafts. A load sensor is connected to the load sensor portion and positioned within the sensor cavity above a portion of the flexure gap. The first mounting portion, the load sensing portion, and the second mounting portion define an integral, weld-free, unitary cast member, into which the sensing cavity is machined and the load sensor is attached.

General Description

Many of the details and features shown in the Figures are merely illustrative of particular embodiments of the technology. Accordingly, other embodiments can have other details and features without departing from the spirit and scope of the present technology. In addition, those of ordinary skill in the art will understand that further embodiments can be practiced without several of the details described below. Furthermore, various embodiments of the technology can include structures other than those illustrated in the Figures and are expressly not limited to the structures shown in the Figures. Moreover, the various elements and features illustrated in the Figures may not be drawn to scale. In the Figures, identical reference numbers identify identical or at least generally similar elements.

FIG. 1 is an isometric view of a prior art fifth wheel support slider assembly 10 supported by a pair of truck or other vehicle frame rails 12. The slider assembly 10 supports a fifth wheel hitch plate 14 above the frame rails 12, such that the longitudinal position of the hitch plate 14 is adjustable relative to the frame rails 12. This conventional slider assembly 10 includes a pair of mounting plates 16 and adjustment tracks 18 mounted to the frame rails 12. Each adjustment track 18 has a plurality of teeth 20 spaced incrementally along the length of the track 18. A pair of support brackets 22 are slidably mounted directly on the adjustment tracks 18, and each support bracket 22 pivotally receives a pivot shaft (not shown) attached to the hitch plate 14. Accordingly, the hitch plate 14 is pivotally adjustable relative to the support brackets 22 and adjustment tracks 18, and the longitudinal position of the hitch plate 14 can be adjusted by sliding the support brackets 22—longitudinally along the adjustment tracks 18.

This conventional fifth wheel support slider assembly 10, however, does not have load cells or other load measuring sensors to detect the load of a fifth wheel trailer when attached to the hitch plate 14. The adjustable support brackets 22 are mounted directly onto the adjustment tracks peak and do not allow for the use of load measuring devices with the slider assembly 10. Modification of the slider assembly 10 to incorporate a conventional load cell assembly would require a substantive increase in the overall height of the hitch plate 14 relative to the frame rails 12, which would result in a substantive height increase in the fifth wheel trailer relative to the frame rails 12. This height increase could meaningfully prevent use of the trailer on roadways or other areas with standard height obstructions, such as bridges, overpasses, arches, etc. Applicant's cast load cell assembly overcomes these and other drawbacks of the prior art.

Figure 2:
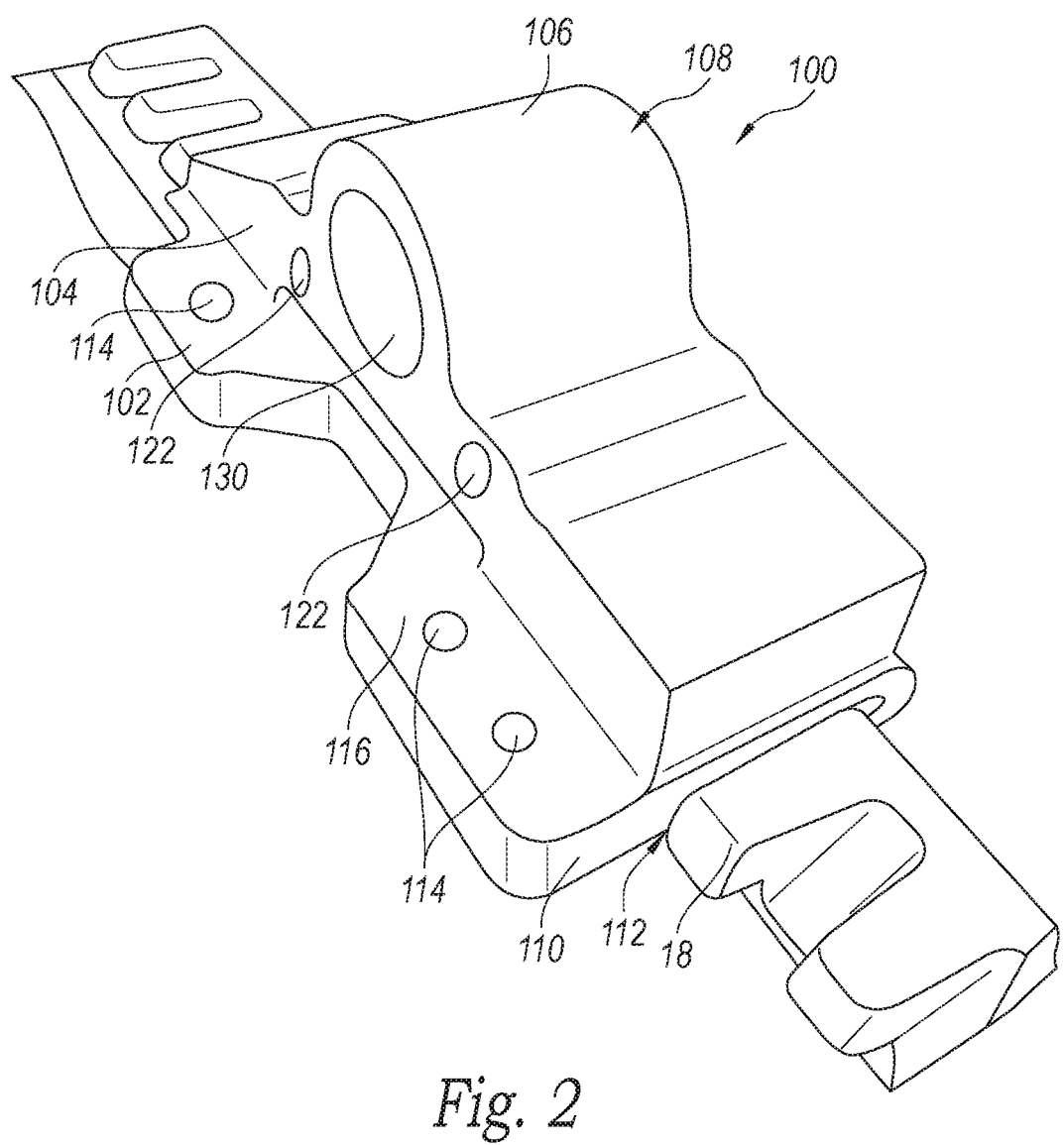
FIG. 2 is an isometric view of a cast load cell assembly in accordance with an embodiment of the present disclosure shown attached to a mounting rail of a fifth wheel mounting system.

FIG. 2 is an isometric view of a cast load cell assembly 100 in accordance with an embodiment of the present disclosure. The illustrated load cell assembly 100 is a low profile, unitary cast member that has a base plate portion 102 configured to slidably mount to a conventional adjustment track 18 discussed above. The load cell assembly 100 also has a load sensing portion 104 integrally connected to the mounting plate portion 102 and to a shaft mounting portion 106 that pivotally receives and supports a respective one of the pivot shafts of the conventional hitch plate 14. Accordingly, the cast load cell assembly 100 provides a unitary assembly with an integral load sensing configuration for use with a conventional hitch plate 14 and adjustment tracks 18 (FIG. 1) without a substantive height increase of the hitch plate relative to the vehicle's frame rails. In some embodiments, the resulting height of the hitch plate may actually be reduced as compared to conventional support brackets for fifth wheel mounting systems.

Figure 3:
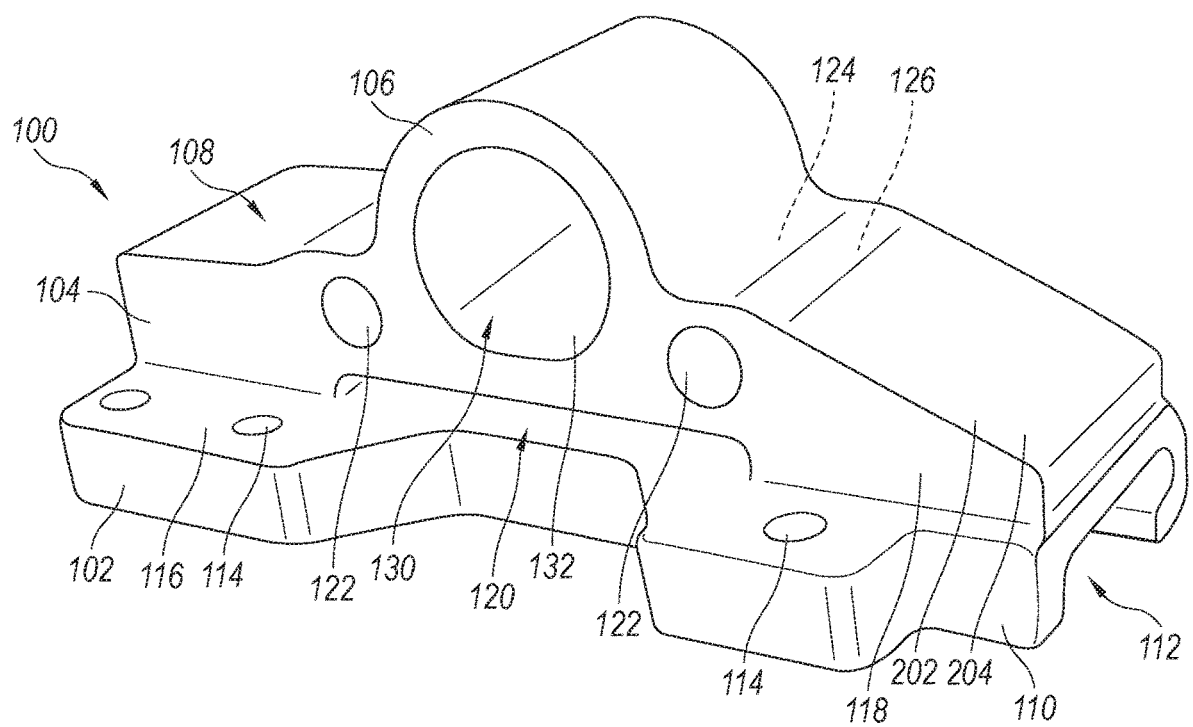
FIG. 3 is an front isometric view of a cast load cell assembly in accordance with an embodiment of the present disclosure.
Figure 4:
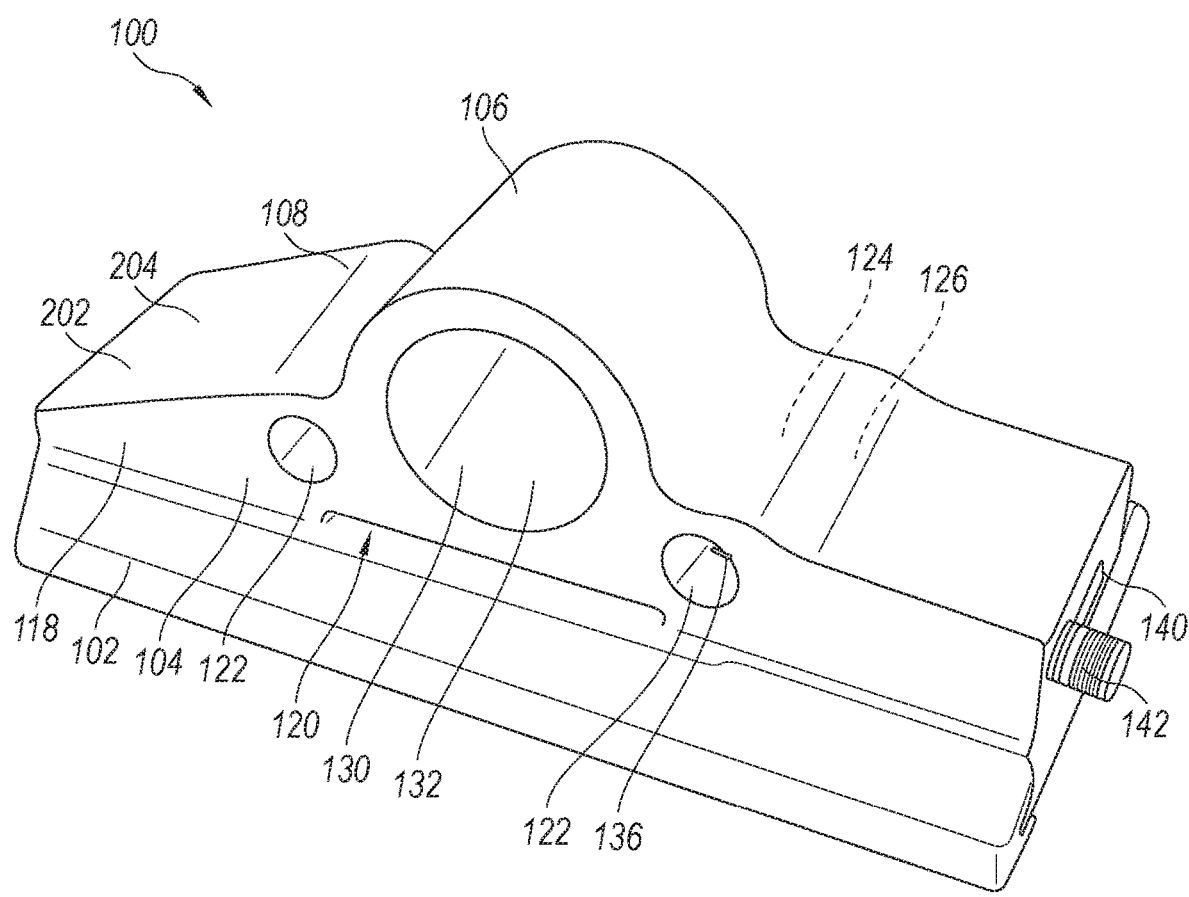
FIG. 4 is a rear isometric view of the cast load cell assembly of FIG. 3.

FIGS. 3-5 are isometric views of the cast load cell assembly 100 shown removed from the adjustment track 18 of FIG. 2. The load cell assembly 100 of the illustrated embodiment a cast steel unit, wherein the base plate portion 102, the load sensing portion 104, and the shaft mounting portion 106 are integrally formed via casting into a unitary, low-profile, weld-free, substantially homogenous cast member 108. In one embodiment, the cast member 108 is an AISI 8630, Grade 150 cast member 108, although other embodiments can use cast members 108 of different materials and/or different grades.

The base plate portion 102 of the illustrated embodiment is configured with a contoured lower portion 110 for use with an adjustable fifth wheel coupling system, such as a SAF-Holland® sliding ILS™ fifth wheel mounting system, or other adjustable mounting system. The lower portion 110 of the base plate portion 102 has a track receiving receptacle 112 shaped and sized to securely and slidably fit onto an adjustment track, such as the prior art adjustment track 18 discussed above (FIG. 1). The base plate portion 102 also has mounting apertures 114 configured to receive fasteners that fixedly attach to one or more cross brace members, which interconnect two opposing cast load cell assemblies 100 together on opposing adjustment tracks of a fifth wheel mounting system. The base plate portion 102 can include a cavity formed, for example, in the middle area that removably receives a locking element, which engages the teeth 20 of the adjustment track 18 (FIG. 1) to lock the cast load cell assembly 100 in a selected position along the adjustment track. Although the base plate portion 102 of the illustrated embodiment is configured for use with an adjustable fifth wheel mounting system, the base plate portion 102 of other embodiments can be configured for use with fixed, non-adjustable fifth wheel mounting systems and/or other adjustable mounting systems.

The base plate portion 102 has a top plate surface 116 that defines a plane, which will be generally parallel to the vehicles frame rails 12 (FIG. 1) during use of the cast load cell assembly 100. The load sensing portion 104 is integrally attached at a lower portion 118 to the base plate portion 102 and extends upwardly away from the top plate surface 116. At least part of the lower portion 118 is spaced apart from the top plate surface 116 to define a flexure gap 120 that allows the load sensing portion 104 to slightly flex and move relative to the top plate surface in response to a load applied to the shaft mounting portion 106. In the illustrated embodiment, the flexure gap 120 is formed during the casting process and extends the full width of the load sensing portion 104. In other embodiments, the flexure gap 120 can be formed by machining the load sensing portion 104 and/or the base plate portion 102 after the casting process. The flexure gap 120 of the illustrated embodiment is formed with rounded corners to avoid any excessive stress concentrations in the assembly during operation.

As seen in FIGS. 4-6, the load sensing portion 104 has at least one sensor cavity 122 that receives a strain gauge 124 or other load sensor that measures the load applied to the shaft mounting portion 106. In the illustrated embodiment, the load sensing portion 104 has a pair of spaced apart sensor cavities 122, wherein at least a portion of each sensor cavity is positioned above the flexure gap 120. The centerlines of the spaced-apart sensor cavities 122 can be substantially the same distance from the top plate surface 116, such that they define a plane substantially parallel to the plane of the top plate surface 116. In at least one embodiment, a sealant is added to the sensor cavity 122 to close out the cavity and block water, moisture, dirt, debris, etc., from entering the sensor cavity and potentially contaminating the strain gauge 124 or other load sensor in the sensor cavity.

The load sensing portion 104 can be configured as a shear beam load cell, wherein the sensor cavity 122 is formed by a blind hole with a web portion 126 extending across the aperture, and the strain gauge 124 is securely adhered or otherwise fastened to the web portion 126, as shown in FIG. 6. In other embodiments, the sensor cavity 122 can be a hole extending fully through the load sensing portion 104, and one or more strain gauges 124 can be, as an example, attached to the wall of the hole to measure the loads. Each sensor cavity 122 is formed after the casting process by machining apertures into the sides of the load sensing portion 104 a sufficient distance to form the relatively thin web of cast steel across the respective sensor cavity 122. The process of machining the sensor cavity 122 also allows for a manufacturer to inspect the internal area of the cast load sensing portion 104 to confirm the area has adequate consistency and uniformity of the cast steel and does not have excessive air bubbles, voids, cracks, gaps, or other substantive defects in this critical area of the cast load cell assembly 100. In other embodiments, the load sensing portion 104 can include an aperture extending completely through the load bearing member with load sensors attached to the walls of the aperture. Other embodiments may be configured for use with other load cell arrangements, such as bending beam load cells, shear pin load cells, or other load cell assemblies.

Figure 7:
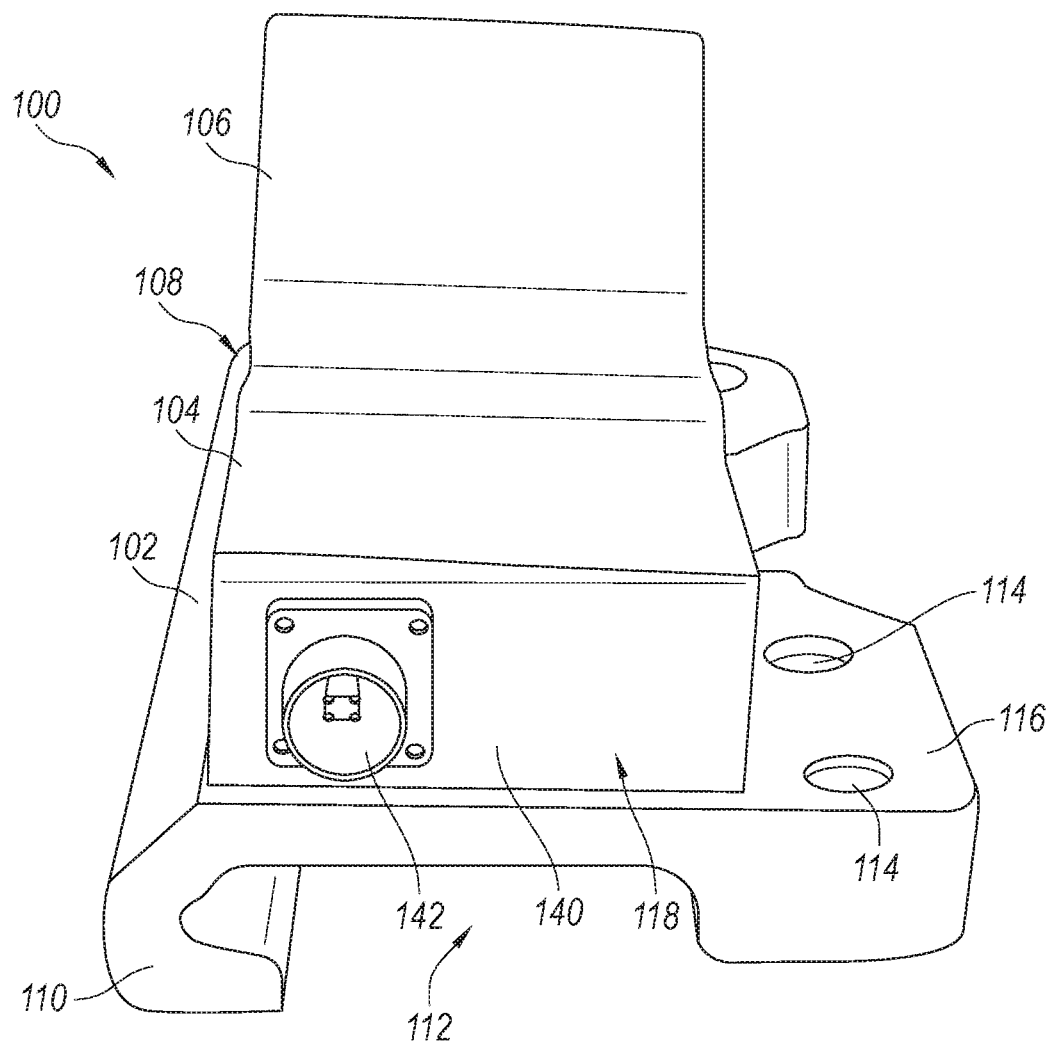
FIG. 7 is an isometric end view of the cast load cell assembly of FIG. 3.
Figure 8:
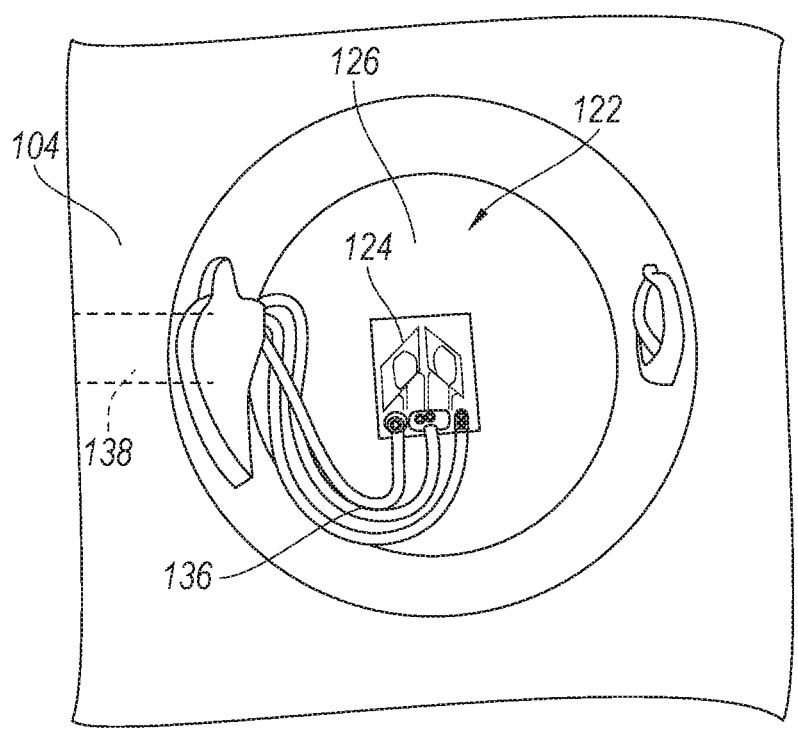
FIG. 8 is an enlarged isometric view of the load sensor in a sensor cavity of the cast load cell assembly of FIG. 3.

As seen in FIGS. 5, 6, and 8, the strain gauges 124 are mounted to the central area of the web portion 126, and lead wires 136 are attached to the strain gauge 124. The load sensing portion 104 has an elongated channel 138 machined or otherwise formed therein that extends longitudinally from one end 140 of the load sensing portion 104 to the sensor cavities 122. The channel 138 is configured to extend under the shaft mounting portion 104 as the channel extends longitudinally through the load sending portion 104. The lead wires 136 extend from the strain gauges 124, into the elongated channel 138 to the end 140 of the load sensing portion 104. The lead wires 136 are attached to an electrical connector 142 (FIG. 7) configured to be coupled to other electronic components, such as a meter, display, receiver, transmitter, and/or other electronic peripheral. As a result, the cast load cell assembly 100 has all internal wires and has no external wires past the end 140 of the load sensing portion 104. In the illustrated embodiment, the electrical connector 142 is mounted to the end 140 of the load sensing portion 104. In other embodiments, the lead wires 136 can extend out of the elongated channel 138 and connect to a connector spaced a selected distance from the load sensing portion 104.

Referring again to FIGS. 3-5, the shaft mounting portion 106 is integrally connected to the load sensing portion 104 and extends upwardly away from the base plate portion 102. The shaft mounting portion 106 has an enlarged central aperture 130 extending therethrough, and the centerline of the aperture 130 is substantially parallel with the top plate surface 116 of the base plate portion 102. The central aperture 130 is positioned above the flexure gap 120 and is shaped and sized to securely receive a respective one of the mounting shafts of the hitch plate 14 (FIG. 1). The central aperture 130 has a flattened bottom portion 132 that mates with a flattened surface of the mounting shaft, although the central aperture 130 can have other shapes or sizes to suitably mate with a mounting shaft of other portion of the hitch plate. In the illustrated embodiment, at least a portion of the shaft mounting portion's central aperture 130 is positioned between portions of the sensor cavities 122 in the load sending portion. Accordingly, a plane parallel with the plane of the top plate surface 116 extends through the central aperture 130 and through the sensor cavities 122 on opposing sides of the central aperture 130.

The cast load cell assembly 100 with the weld-free, substantially homogenous, unitary cast member 108 provides a low profile assembly with incorporated load sensors that can accurately and quickly measure and monitor loads from the fifth wheel trailer mounted to the hitch plate. The cast load cell assembly 100 does not substantively add to the overall height of the hitch plate relative to the vehicle frame rails 12. This cast configuration also eliminates the labor intensive process of welding components together, which can decrease the cost and man-hours needed for manufacture of a fifth wheel load cell assembly.

In the illustrated embodiment, when a load is applied to the cast load cell assemblies 100 via the mounting shafts of the hitch plate 14 (FIG. 1), the resulting forces act along force lines of action or planes of force. In a conventional load cell system, such as for a fixed fifth wheel mounting system, the force lines of actions are intentionally spaced away from the sensor areas, in part because of how the components of the systems are machined and welded together. The unitary cast structure of the present disclosure allows the cast load cell assembly to have the force lines of action closer to the sensor cavities 122 or even partially overlapping with the sensor cavities, while still allowing the strain gauges to accurately detect and monitor the loads applied to the cast load cell assembly 100. This configuration can allow greater flexibility in cast load cell assembly designs for other systems that would benefit from use of a compact, lower profile load cell system.

Figure 9:
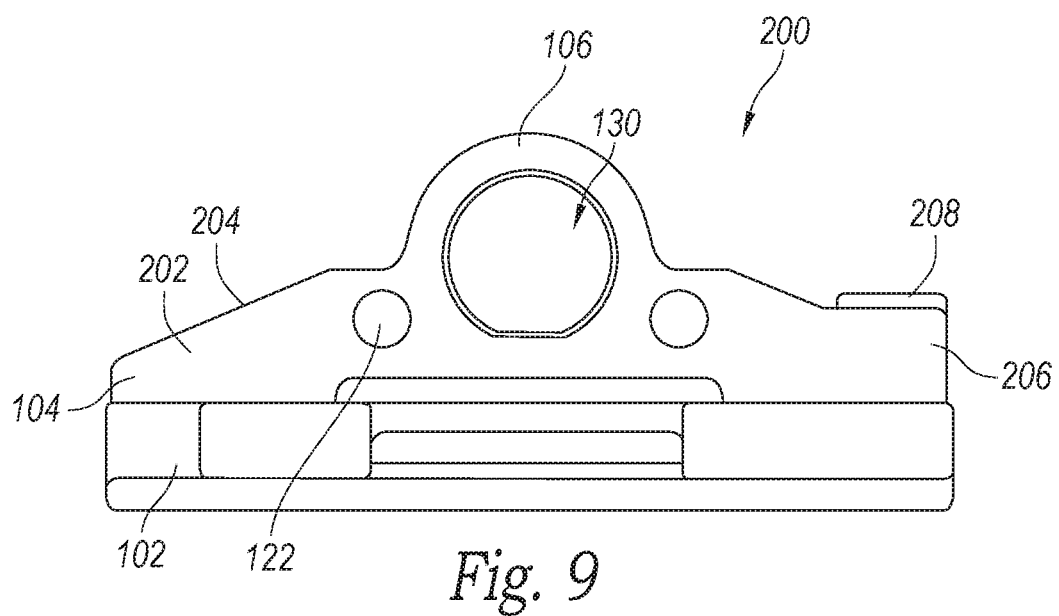
FIG. 9 is an elevation view of a cast load cell assembly in accordance with another embodiment of the present disclosure.

FIG. 9 is a front elevation of a cast load cell assembly 200 of an alternate embodiment. This cast load cell assembly is substantially similar to the cast load cell 100 discussed above, although the end portions of the load sensing portion 104 have shaped contours. The trailing end 202 of the load sensing portion 104 has a sloped surface 204 (similar to FIGS. 3-5) that allows the hitch plate 14 (FIG. 1) a greater range of pivotal movement in at least one direction about the mounting shaft and the shaft aperture 130 in the shaft mounting portion 106. The leading end 206 of the load sensing portion 104 has an integral pivot stop 208 projecting upwardly that blocks the hitch plate 14 (FIG. 1) from rotating in the opposite direction past a selected position relative to the load sensing portion. Other embodiments can have other features cast with or otherwise affixed to the load sensing portion 104, the shaft mounting portion 106, or the base plate portion 102.

Figure 10:
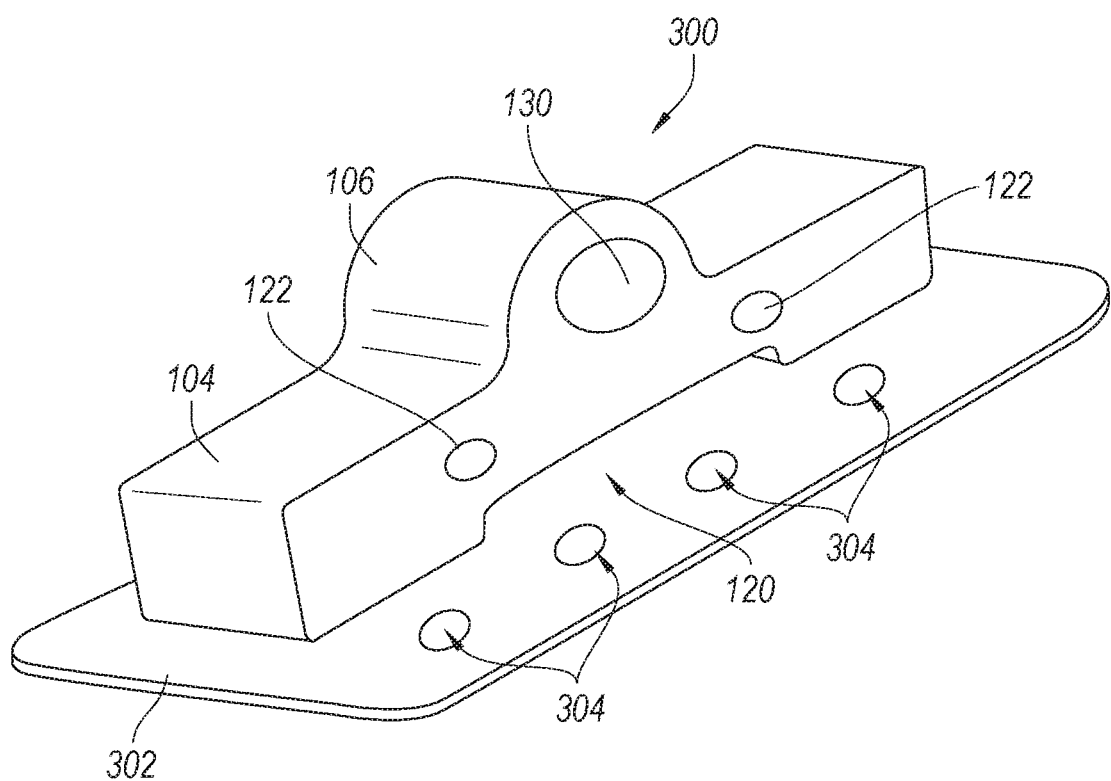
FIG. 10 is an isometric view of another embodiment of a cast load cell assembly in accordance with the present disclosure for use with a fixed fifth wheel mounting system.

FIG. 10 is an isometric view of a cast load cell assembly 300 of another embodiment for use with a fixed mounting system. For example, the cast load cell assembly 300 has the integrally, unitary cast member with the base plate portion 302, the load sensing portion 104, and the shaft mounting portion 106. The base plate portion 302 is a substantially planar member configured to bolt to a mounting frame system so the cast load cell assembly 300 is fixed in place and is not longitudinally adjustable. The base plate portion 302 has a plurality of mounting holes 304 that can receive bolts or other fasteners to affix the assembly to the vehicle or to frame or cross members affixed to the vehicle. Other embodiments can have a base plate portion configured for other attachment arrangements for fifth wheel mounting systems or other trailer mounting systems.

Figure 11:
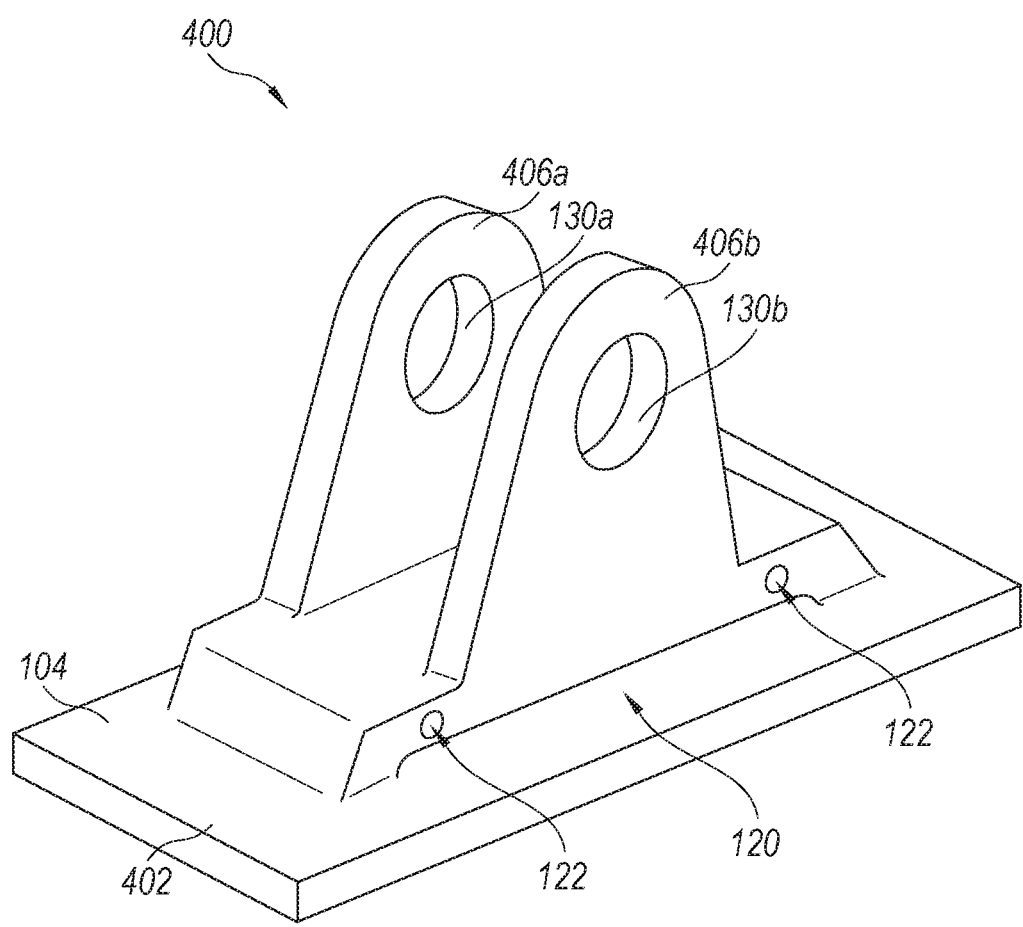
FIG. 11 is an isometric view of another embodiment of a cast load cell assembly in accordance with the present disclosure.

FIG. 11 is an isometric view of a cast load cell assembly 400 of another embodiment similar to the embodiment illustrated in FIG. 10, except for some of the differences discussed below. The cast load cell assembly 400 has the integrally, unitary cast member with the base plate portion 402 mountable to a first portion of a vehicle. The base plate portion 402 is connected to and supports the load sensing portion 104, which is integrally connected to the shaft mounting portion 106. The shaft mounting portion 106 is connectable to a second portion of the vehicle that is movable relative to the first portion of the vehicle, so as to allow the flexure gap 120 to flex as a function of the load applied to the cast load cell assembly 400. In the illustrated embodiment, the load sensing portion 106 comprises a pair of spaced apart connector plates 406a and 406b positioned above the flexure gap 120 and projecting away from the load sensing portion 104 and the base plate 402. The connector plates 406a and 406b have coaxially aligned central apertures 130a and 130b, respectively, configured to receive a mounting member, such as a rod or other suitable structure, connected to the second portion of the vehicle. The connector plates 406a and 406b can be substantially parallel to each other and substantially perpendicular to the base plate portion 402. The cast load cell assembly 400 can be used with vehicles having a trailer configuration, as well as other vehicles configured to carry loads, such as dump trucks, mixer trucks, refuse trucks, or other vehicles wherein information about the vehicle's load is to be measured and/or monitored. For simplicity, the base plate 402 is shown as a flat plate. The base portion 402 can also be configured to fit existing truck structures.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

The invention claimed is:

1. A cast load cell assembly for use with a vehicle configured to carry a load; comprising:
a first mounting portion coupleable to a first portion of the vehicle, the first mounting portion having an upper surface defining a first longitudinal plane, the first mounting portion including a plurality of holes positioned to receive fasteners to couple the first mounting portion to a first portion of the vehicle;
a load sensing portion formed integrally with and connected to the first mounting portion and having a flexure portion that includes a flexure gap, wherein the load sensing portion includes at least one sensor cavity adjacent an end portion of the flexure gap and positioned in a second longitudinal plane, and wherein the second longitudinal plane is spaced apart from the first longitudinal plane and the flexure gap;
a second mounting portion coupleable to a second portion of the vehicle movable relative to the first portion of the vehicle, the second mounting portion formed integrally with and connected to the load sensing portion and positioned at least partially in the second longitudinal plane; the second mounting portion has a receptacle formed as a pivot to receive the second portion of the vehicle, wherein a second longitudinal plane extends through at least a portion of the receptacle; and
a load sensor connected to the load sensing portion and positioned within the sensor cavity above a portion of the flexure gap;
wherein the first mounting portion, the load sensing portion, and a second mounting portion define a weld-free, substantially homogenous, unitary cast member.

2. The cast load cell of claim 1 wherein the first mounting portion has a vehicle engaging surface defining a third longitudinal plane spaced apart from the first longitudinal plane.

3. The cast load cell of claim 1 wherein the sensor cavity has a web portion extending thereacross and the load sensor is mounted on the web portion.

4. The cast load cell of claim 1 wherein the sensor cavity includes at least one aperture machined into the cast load sensing portion.

5. The cast load cell of claim 1 wherein the sensor cavity is a first sensor cavity, and the load sensing portion has a second sensor cavity adjacent the second end portion of the flexure gap and in the first longitudinal plane.

6. The cast load cell of claim 1 wherein the sensor has a lead wire and a connector attached to the lead wire, the load sensing portion has a channel extending therethrough and in communication with the sensor cavity, wherein the connector is positioned adjacent to a side of the load sensing portion away from the sensor cavity.

7. The cast load cell of claim 1 wherein the flexure gap is formed upon casting the unitary cast member.

8. A unitary, cast load cell for use with a vehicle, comprising:
first mounting portion having plurality of holes positioned to receive fasteners for connection to a first portion of the vehicle, the first mounting portion having a first longitudinal plane extending therethrough;
a load sensing portion integrally formed with and connected to the first mounting portion, the load sensing portion having a flexure portion spaced apart from the first mounting portion and defining a flexure gap therebetween that allows the sensing portion to move relative to the first mounting portion in response to a load on the load sensing portion, the load sensing portion having first and second sensor cavities adjacent longitudinal ends of the flexure gap, wherein a second longitudinal plane extends from the first sensor cavity to the second sensor cavity, and wherein the second longitudinal plane is spaced apart from the first longitudinal plane and the flexure gap;

a second mounting portion integrally formed with and connected to the load sensing portion spaced apart from the flexure gap, the second mounting portion including a connection portion connectable to a second portion of the vehicle movable relative to the first portion of the vehicle and connected to the load sensing portion spaced apart from the flexural gap, wherein the second longitudinal plane extends through at least a portion of the connection portion; the second mounting portion has a receptacle formed as a pivot to receive the second portion of the vehicle, wherein a second longitudinal plane extends through at least a portion of the receptacle;

a first load sensor connected to the load sensing portion and positioned within the first sensor cavity spaced apart from a portion of the flexure gap; and a second load sensor connected to the load sensing portion and positioned within the second sensor cavity spaced apart from a portion of the flexure gap, wherein the first mounting portion, the load sensing portion, and second mounting portion define a weld-free unitary cast member with the first and second sensing cavities formed therein and the first and second load sensors are attached.

9. The load cell of claim 8 wherein the first and second sensor cavities each have a web portion extending thereacross and the first and second load sensors are mounted on the web portion.

10. The load cell of claim 8 wherein the cast member is a cast steel member.

11. The load cell of claim 8 wherein the first sensor has a lead wire and a connector attached to the lead wire, the load sensing portion has a lead channel extending therethrough and in communication with the first sensor cavity, wherein the connector is positioned adjacent to a side of the load sensing portion away from the sensor cavity.

12. The load cell of claim 11 wherein the lead channel is oriented substantially normal to the sensor cavity.

13. The load cell of claim 8 wherein the first mounting portion is a plate portion with a vehicle-engaging surface defining the first longitudinal plane.

14. A cast load cell for use with a vehicle, the cast load cell comprising: a weld free, substantially homogenous unitary cast member having a load sensing portion, the load sensing portion having a gap having a first end portion and a second end portion, wherein the gap allows the load sensing portion to flex and move; and a sensor cavity adjacent one of the first and second end portions in a first longitudinal plane spaced apart from the gap; a load mounting portion integrally formed with and connected to the load sensing portion, the load mounting portion connected to the load sensing portion spaced apart from the gap and disposed at least partially in the first longitudinal plane; the load mounting portion has a receptacle formed as a pivot to receive a first portion of the vehicle, wherein the first longitudinal plane extends through at least a portion of the receptacle; and a vehicle mounting portion integrally formed with and connected to the load sensing portion, the vehicle mounting portion disposed in a second longitudinal plane offset from the first longitudinal plane and having a plurality of holes positioned to receive fasteners to affix the cast load cell to a second portion of the vehicle; and a load sensor connected to the load sensing portion and positioned within the sensor cavity.

15. The cast load cell of claim 14 wherein the second longitudinal plane is spaced at least partially apart from the gap.

16. The cast load cell of claim 14 wherein the sensor cavity includes— a first sensor cavity adjacent the first end portion of the gap; and a second sensor cavity spaced apart from the first sensor cavity and adjacent the second end portion of the gap, wherein each of the first and second sensor cavities are disposed in the first longitudinal plane.

17. The cast load cell of claim 14 wherein the plurality of holes are machined into a substantially homogenous unitary cast member.

18. The cast load cell of claim 14 wherein the sensor cavity includes at least one aperture machined into the load sensing portion of the substantially homogenous unitary cast member.

* * * * *